US010360300B2

(12) United States Patent
Sarikaya et al.

(10) Patent No.: US 10,360,300 B2
(45) Date of Patent: Jul. 23, 2019

(54) MULTI-TURN CROSS-DOMAIN NATURAL LANGUAGE UNDERSTANDING SYSTEMS, BUILDING PLATFORMS, AND METHODS

(71) Applicant: Microsoft Technology Licensing, LLC, Redmond, WA (US)

(72) Inventors: Ruhi Sarikaya, Redmond, WA (US); Young-Bum Kim, Fairview, WA (US); Alexandre Rochette, Montreal (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

(21) Appl. No.: 15/245,832

(22) Filed: Aug. 24, 2016

(65) Prior Publication Data
US 2018/0060303 A1    Mar. 1, 2018

(51) Int. Cl.
*G06F 17/27*    (2006.01)
*G10L 15/06*    (2013.01)
*G10L 15/22*    (2006.01)

(52) U.S. Cl.
CPC ...... *G06F 17/2785* (2013.01); *G06F 17/2705* (2013.01); *G06F 17/2765* (2013.01); *G10L 15/063* (2013.01); *G10L 15/22* (2013.01)

(58) Field of Classification Search
CPC combination set(s) only.
See application file for complete search history.

(56) References Cited

U.S. PATENT DOCUMENTS

| 8,731,924 | B2 | 5/2014 | Tur |
| 9,070,366 | B1 | 6/2015 | Mathias et al. |
| 9,292,492 | B2 | 3/2016 | Sarikaya et al. |
| 9,311,298 | B2 | 4/2016 | Sarikaya et al. |
| 2014/0163959 | A1 | 6/2014 | Hebert et al. |
| 2014/0222528 | A1* | 8/2014 | Chang ............... G06Q 30/016 705/7.42 |
| 2014/0249804 | A1 | 9/2014 | Jackson |

(Continued)

OTHER PUBLICATIONS

Jeong, et al. "Multi-domain Spoken Language Understanding with Transfer Learning", In Journal of the Speech Communication, Elsevier Science Publishers, vol. 51, Issue 5, May 1, 2009, pp. 412-424.

(Continued)

*Primary Examiner* — Vu B Hang

(57) ABSTRACT

Multi-turn cross-domain natural language understanding (NLU) systems and platforms for building the multi-turn cross-domain NLU system are provided. Further, methods for using and building the multi-turn cross-domain NLU system are provided. More specifically, the multi-turn cross-domain NLU system supports multi-turn bot/agent/application scenarios for new domains without having to select a task definition and/or define a new schema during the building of the NLU system. Accordingly, the platform for building the multi-turn cross-domain NLU system that does not require the builder to select a task and/or build a schema for a selected task provides an easy to use, cost effective, and efficient service for building a NLU system. Further, the multi-turn cross-domain NLU system provides a more versatile NLU system than previously utilized NLU systems that were trained for and limited to a selected task and/or domain.

20 Claims, 16 Drawing Sheets

(56) References Cited

U.S. PATENT DOCUMENTS

2015/0179168 A1 6/2015 Hakkani-Tur et al.
2016/0162467 A1* 6/2016 Munro .................. G06F 17/277
704/9

OTHER PUBLICATIONS

Lee, et al. "Unsupervised Spoken Language Understanding for a Multi-Domain Dialog System", In IEEE Transactions on Audio, Speech, and Language Processing, vol. 21, Issue 11, Nov. 2013, pp. 2451-2464.

Kim, et al. "Natural Language Model Re-usability for Scaling to Different Domains", In Proceedings of Conference on Empirical Methods in Natural Language Processing, Nov. 1, 2016, 6 Pages.

"International Search Report and Written Opinion Issued in PCT Application No. PCT/US2017/047463", dated Nov. 7, 2017, 12 Pages.

Hixon, et al., "Learning Knowledge Graphs for Question Answering through Conversational Dialog", In Proceedings of the Conference of the North American Chapter of the Association for Computational Linguistics: Human Language Technologies, May 31, 2015, 11 pages.

Kim, et al., "New Transfer Learning Techniques for Disparate Label Sets", In Proceedings of the 53rd Annual Meeting of the Association for Computational Linguistics, Jul. 26, 2015, 10 pages.

El-Kahky, et al., "Extending Domain Coverage of Language Understanding Systems via Intent Transfer Between Domains Using Knowledge Graphs and Search Query Click Logs", In Proceedings of IEEE International Conference on Acoustic, Speech and Signal Processing, May 4, 2014, 5 pages.

Liu, et al., "Natural Language Understanding for Partial Queries", In Proceedings of IEEE Workshop on Automatic Speech Recognition and Understanding, Dec. 13, 2015, 4 pages.

Xu, et al., "Contextual Domain Classification in Spoken Language Understanding Systems Using Recurrent Neural Network", In Proceedings of IEEE International Conference on Acoustics, Speech and Signal Processing, May 4, 2014, 5 pages.

Li, et al., "Distributed Open-Domain Conversational Understanding Framework with Domain Independent Extractors", In Proceedings of IEEE Spoken Language Technology Workshop, Dec. 7, 2014, 6 pages.

Ryu, et al., "Detecting Multiple Domains from User's Utterance in Spoken Dialog System", In Proceedings of the International Workshop on Spoken Dialogue Systems, Jan. 11, 2015, 10 pages.

* cited by examiner

Mobile Computing Device

MULTI-TURN CROSS-DOMAIN NATURAL LANGUAGE UNDERSTANDING SYSTEMS, BUILDING PLATFORMS, AND METHODS

BACKGROUND

Language understanding systems, personal digital assistants, agents and artificial intelligence are changing the way users interact with the computers. Developers of computers, web services, and/or applications are always trying to improve the interactions between humans and computers. However, building such systems requires significant amount of expertise, time, money, and other resources.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to a multi-turn cross-domain natural language understanding (NLU) system and a platform for building the multi-turn cross-domain NLU system and methods for using and building the multi-turn cross-domain NLU system. The multi-turn cross-domain NLU system supports multi-turn bot/agent/application scenarios for new domains without a having to select a task definition and/or a new schema. Accordingly, the ability of the systems and methods described herein to build a multi-turn cross-domain NLU system without requiring the builder to select a task and/or a schema provides an easy to use, cost effective, and efficient platform for building a NLU systems. Further, the ability of the systems and methods described herein to predict a schema based on a received user input and to utilize the predicted schema to decode the user input provides a more versatile NLU system than previously utilized NLU systems that were limited to a selected task and/or domain.

One aspect of the disclosure is directed to a multi-turn cross-domain natural language understanding (NLU) system for an application. The system includes at least one processor and a memory. The memory encodes computer executable instruction that, when executed by the at least one processor, are operative to:
  receive a user input;
  predict a schema utilizing a schema prediction model based on the user input;
  constrain a NLU model based on the schema to form a constrained NLU model; and
  decode the user input utilizing the constrained NLU model to determine a response to the user input.

Another aspect of the disclosure is directed to a system with a platform for building multi-turn cross-domain natural language understanding (NLU) system for an application. The system includes at least one processor and a memory. The memory encodes computer executable instruction that, when executed by the at least one processor, are operative to:
  retrieve multi-domain multi-turn tasks;
  train a first model utilizing the multi-domain multi-turn tasks to predict schematic labeling of a user input to form a schema prediction model;
  retrieve multi-domain multi-turn NLU data; and
  train a second model utilizing the multi-domain multi-turn NLU data to form a natural language understanding (NLU) model.

The schema prediction model and the NLU model form the multi-turn cross-domain NLU system.

Yet another aspect of the disclosure includes a method for building a multi-turn cross-domain natural language understanding (NLU) system. The method includes:
  training a first model to predict schematic labeling of a user input to form a schema prediction model; and
  training a second model to form a NLU model.

The schema prediction model and the NLU model form the multi-turn cross-domain NLU system. The multi-turn cross-domain NLU system is capable of:
  receiving the user input;
  predicting a schema utilizing the schema prediction model based on the user input;
  constraining the NLU model based on the schema to form a constrained NLU model; and
  decoding the user input utilizing the constrained NLU model to determine a response to the user input.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Figure 1A:
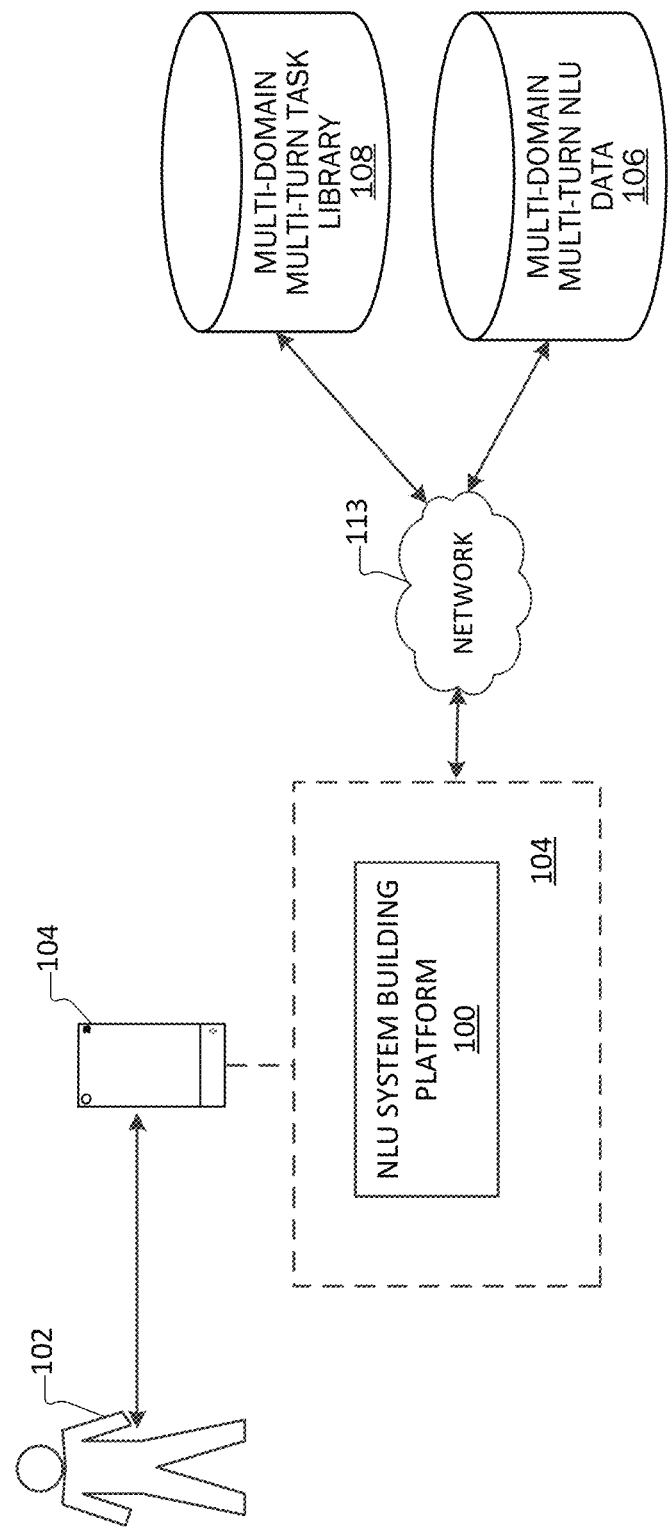
FIG. 1A is a schematic diagram illustrating a NLU system building platform being utilized by a builder via a client computing device, in accordance with aspects of the disclosure.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Progress in machine learning, language understanding and artificial intelligence are changing the way users interact with the computers. Digital assistant applications, such as Siri, Google Now and Cortana are examples of the shift in human computer interaction.

It is widely expected that the next wave of computing would be around conversation as a platform (CaaP). Bot platforms for building conversational agents for applications and services are emerging as an instance of CaaP. Bots are primarily targeting messaging workflows such as messenger, webchat and skype, where the main form interaction is through text (typing), even though touch and speech can also be used as additional modalities. A user can interact with a bot through multi-turn dialog. However, CaaP will be a reality only if the third party applications and services can easily build a bot to serve the customers. This will enable scaling to tens of thousands of applications and services.

Single-turn and/or multi-turn natural language understanding (NLU) systems is a key component for building bots. However, building a task/domain-specific NLU system is the most expensive and time consuming step in the building of a bot. As such, the building of a task/domain-specific NLU system often prohibits third parties from building their own bots and applications. For example, the building of a task/domain-specific NLU system requires 1) a task definition and policy, 2) a new schema, intents and slots extracted from the natural language query, and 3) collecting and annotating new NLU data (especially for multi-turn bot scenario). As such, the complexity and the resources necessary to build a NLU system is a bottleneck in adopting conversational interfaces more widely. Accordingly, most developers are unable to create NLU systems. As such, a builder of a NLU system still has to have a significant amount of domain expertise, knowledge, time, and resources to create a functional NLU system utilizing these previous systems and methods. There is currently no easy or scalable way to author a NLU system.

Therefore, a multi-turn cross-domain NLU system and a platform for building such a system are disclosed herein. Further, a method for building and using the multi-turn cross-domain NLU system is disclosed herein. The multi-turn cross-domain NLU system supports multi-turn bot scenarios for new domains without having to select a task definition and/or a new schema. Instead, the multi-turn cross-domain NLU system utilizes a set of existing domains with labeled data to serve as training examples. For example, the platform for building the multi-turn cross-domain NLU system includes training a first model to for a schema prediction model and training second model to form a general NLU model. The trained schema prediction model and the trained general NLU model form the multi-turn cross-domain NLU system. The multi-turn cross-domain NLU system predicts a schema based at least on a received user input and utilizes the predicted schema to decode the user input.

The ability of the systems and methods described herein to build a multi-turn cross-domain NLU system without requiring the builder to select a task and/or a schema provides an easy to use, cost effective, and efficient platform for building NLU systems. Further, ability of the systems and methods described herein to predict a schema based on a received user input and to utilize the predicted schema to decode the user input provides a more versatile NLU system than previously utilized NLU systems that were limited to a selected task and/or domain. The formation of a NLU system that is not limited to a specific task allows first and third party developers to use the same off-the-shelf multi-turn cross-domain NLU system for different tasks, applications, and/or bots without having to build a task specific NLU system for each new task, domain, and/or application.

Figure 1B:
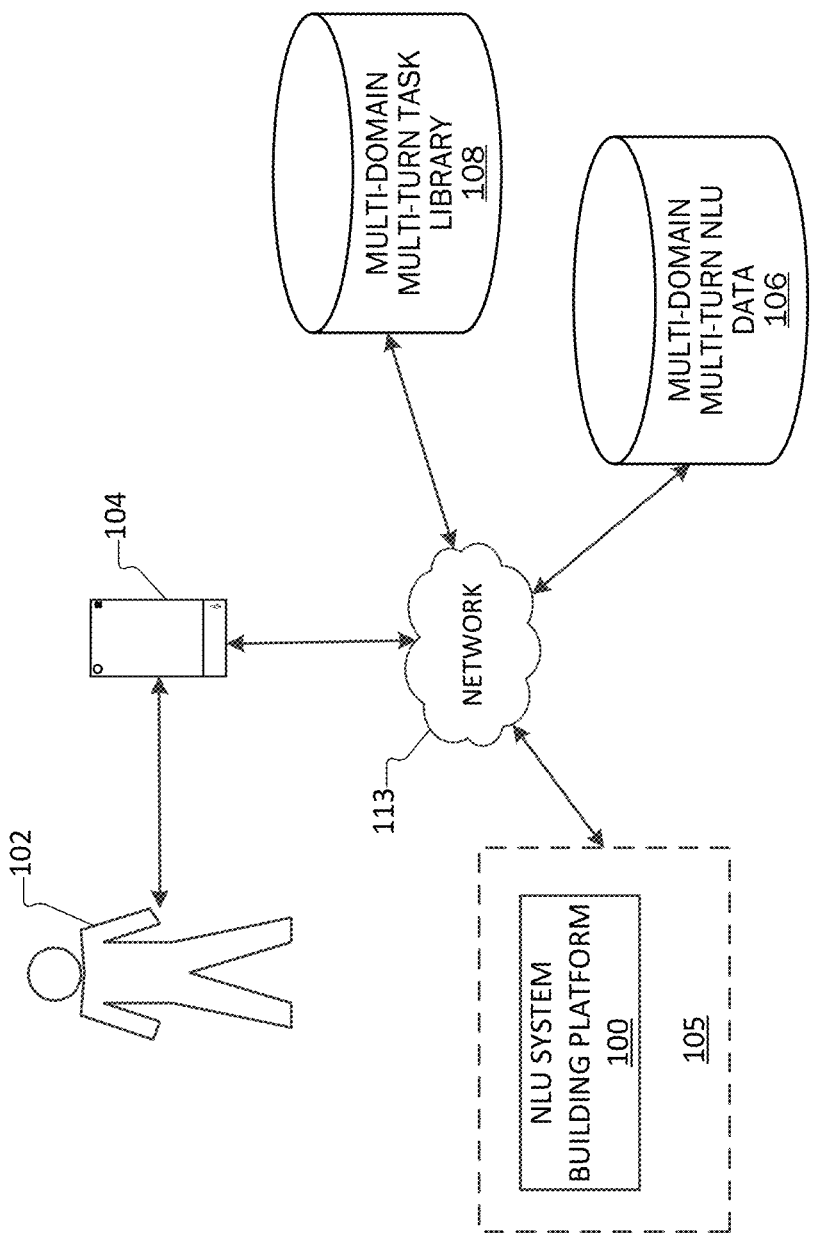
FIG. 1B is a schematic diagram illustrating a NLU system building platform being utilized by a builder via a client computing device, in accordance with aspects of the disclosure.

FIGS. 1A and 1B illustrate different examples of a NLU system building platform 100 being utilized by a builder 102 (or user 102 of the NLU system building platform 100) via a client computing device 104, in accordance with aspects of the disclosure. The NLU system building platform 100 is a platform that allows a builder 102 (or user of the NLU system building platform 100) to develop, build, or author a multi-turn multi-domain NLU system 101 without having to select a task or a schema for the NLU system. In contrast, previously utilized systems for building a NLU system required the builder 102 to select a task or domain for the NLU system along with a schema for the selected task.

In some aspects, the NLU system building platform 100 is implemented on the client computing device 104 as illustrated in FIG. 1A. In a basic configuration, the client computing device 104 is a computer having both input elements and output elements. The client computing device 104 may be any suitable computing device for implementing the NLU system building platform 100. For example, the client computing device 104 may be a mobile telephone, a smart phone, a tablet, a phablet, a smart watch, a wearable computer, a personal computer, a gaming system, a desktop computer, a laptop computer, and/or etc. This list is exemplary only and should not be considered as limiting. Any suitable client computing device 104 for implementing the NLU system building platform 100 may be utilized.

In other aspects, the NLU system building platform 100 is implemented on a server computing device 105, as illustrated in FIG. 1B. The server computing device 105 may provide data to and/or receive data from the client computing device 104 through a network 113. In some aspects, the network 113 is a distributed computing network, such as the internet. In further aspects, that NLU system building platform 100 is implemented on more than one server computing device 105, such as a plurality or network of server computing devices 105. In some aspects, the NLU system building platform 100 is a hybrid system with portions of the NLU system building platform 100 on the client computing device 104 and with portions of the NLU system building platform 100 on the server computing device 105.

FIGS. 3A-3D illustrate different examples of a built multi-turn multi-domain NLU system 101 being utilized by a user 103 via a client computing device 104, in accordance with aspects of the disclosure. The multi-turn cross-domain NLU system 101 may be utilized for any number of different tasks and is not limited to one task or domain. As used herein, multi-domain and cross-domain are considered equivalent and utilized herein interchangeably. In contrast, previously utilized NLU systems where limited to predetermined tasks and/or domains. The multi-turn multi-domain NLU system 101 can be utilized for different tasks because system 101 can predict a schema based on a user input. As such, the multi-turn multi-domain NLU system 101 includes a schema prediction model 115 and a general multi-turn NLU model 117.

Figure 3A:
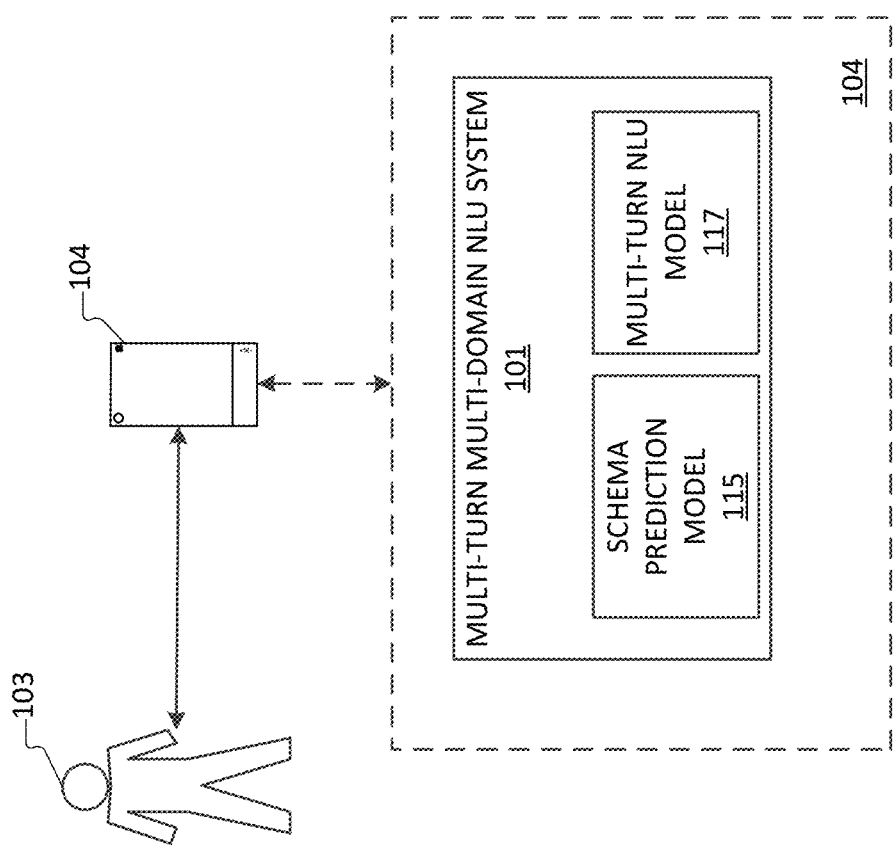
FIG. 3A is a schematic diagram illustrating a multi-turn cross-domain NLU system being utilized by a user via a client computing device, in accordance with aspects of the disclosure.

In some aspects, the multi-turn multi-domain NLU system 101 is implemented on the client computing device 104 as illustrated in FIG. 3A. The client computing device 104 may be any suitable computing device for implementing the multi-turn multi-domain NLU system 101. For example, the client computing device 104 may be a mobile telephone, a smart phone, a tablet, a phablet, a smart watch, a wearable computer, a personal computer, a gaming system, a desktop computer, a laptop computer, and/or etc. This list is exemplary only and should not be considered as limiting. Any suitable client computing device 104 for implementing multi-turn multi-domain NLU system 101 may be utilized.

Figure 3B:
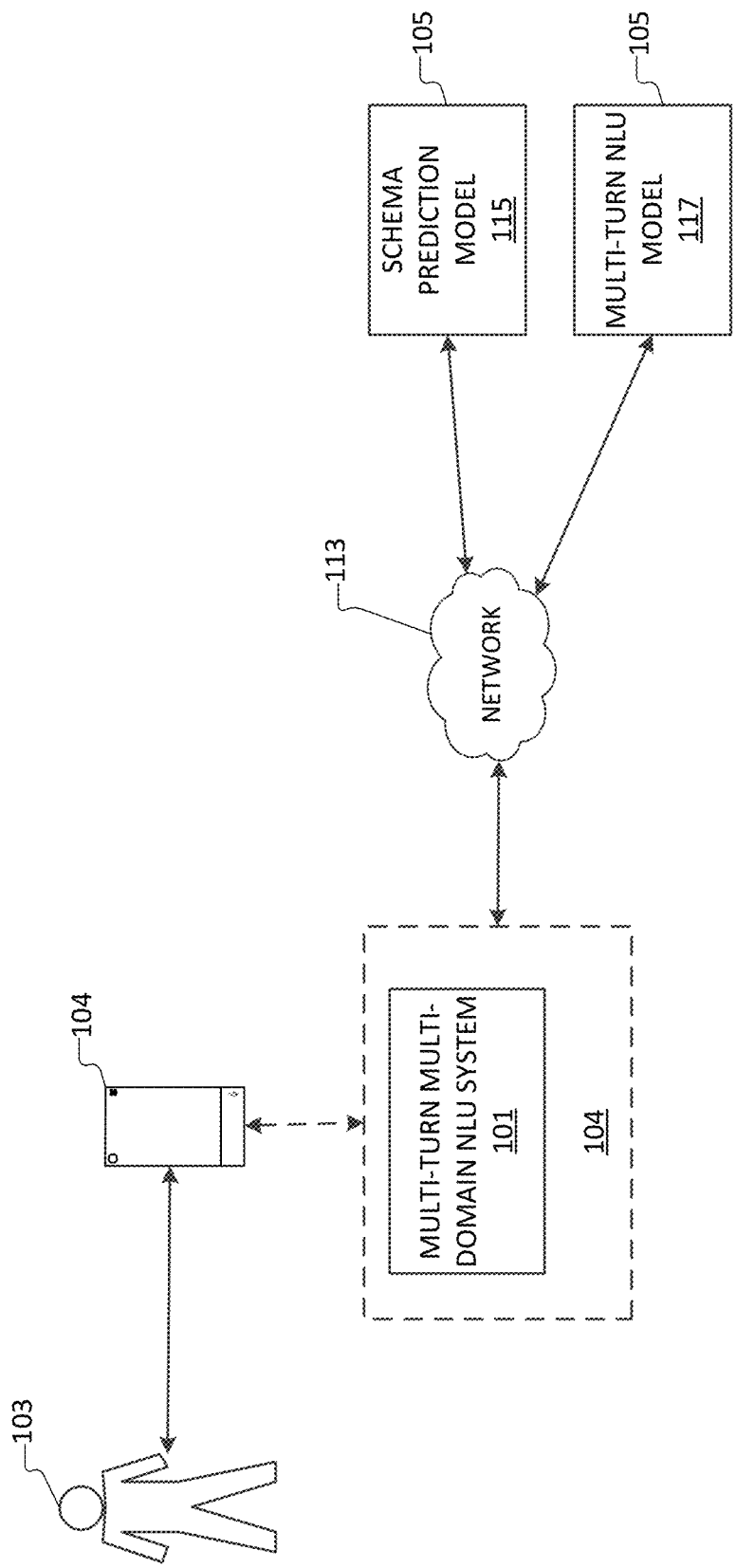
FIG. 3B is a schematic diagram illustrating a multi-turn cross-domain NLU system being utilized by a user via a client computing device, in accordance with aspects of the disclosure.
Figure 3C:
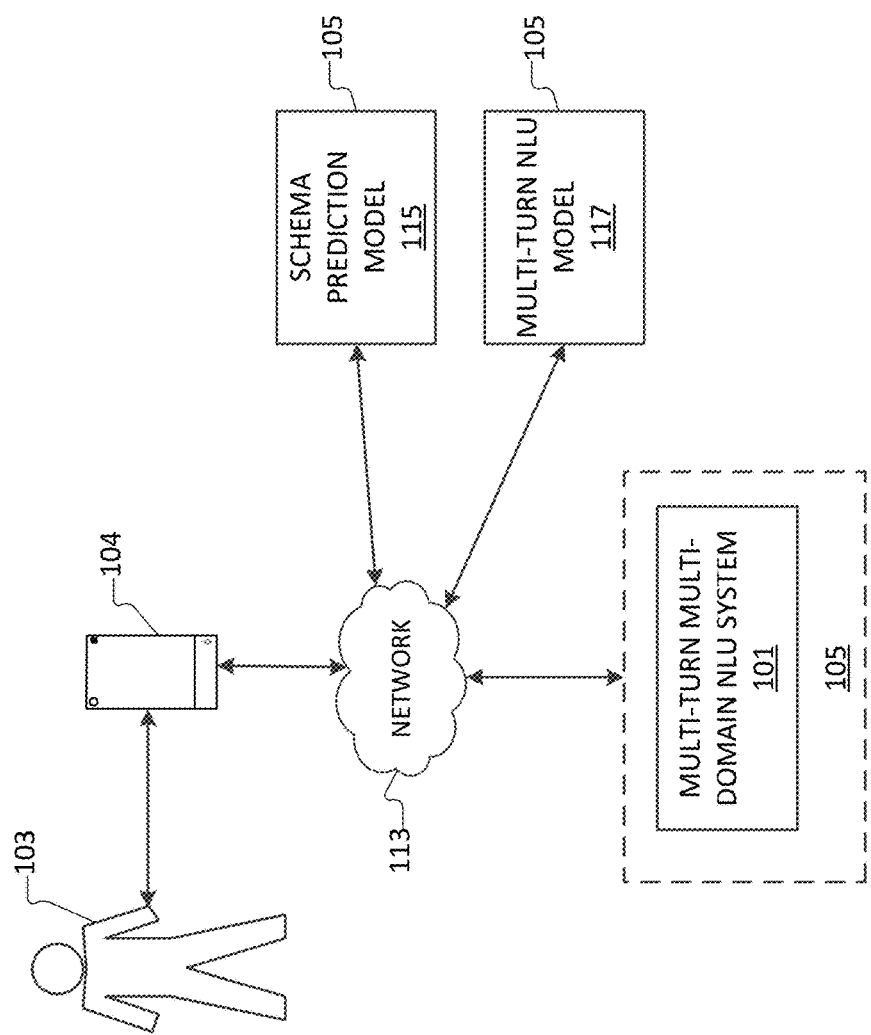
FIG. 3C is a schematic diagram illustrating a multi-turn cross-domain NLU system being utilized by a user via a client computing device, in accordance with aspects of the disclosure.
Figure 3D:
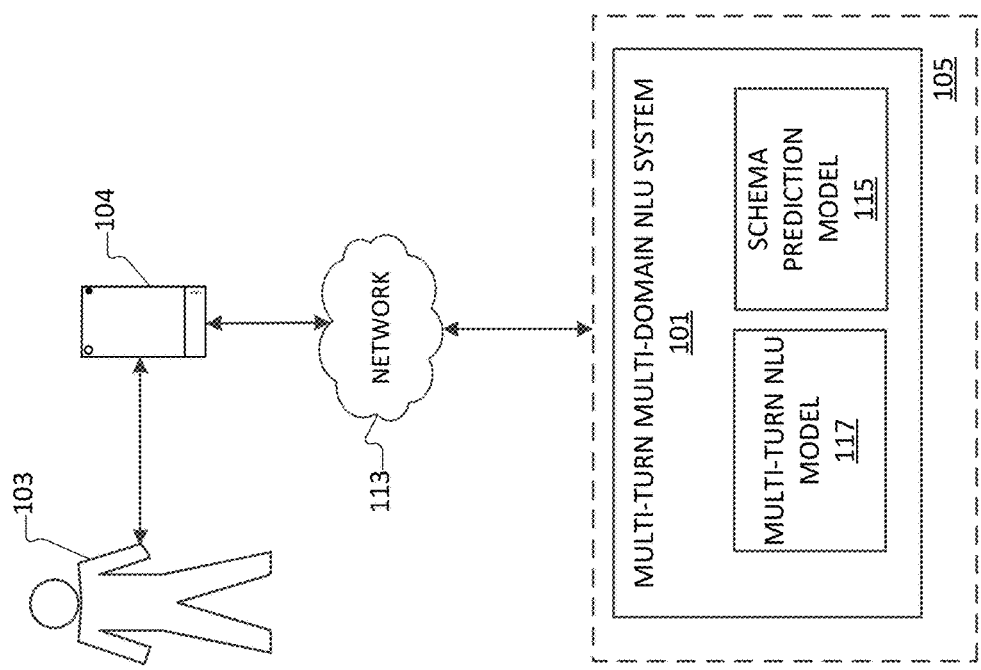
FIG. 3D is a schematic diagram illustrating a multi-turn cross-domain NLU system being utilized by a user via a client computing device, in accordance with aspects of the disclosure.

In other aspects, the multi-turn multi-domain NLU system 101 is implemented on a server computing device 105, as illustrated in FIG. 3D. The server computing device 105 may provide data to and/or receive data from the client computing device 104 through a network 113. In further aspects, that multi-turn multi-domain NLU system 101 is implemented on more than one server computing device 105, such as a plurality or network of server computing devices 105 as Illustrated in FIG. 3C. In some aspects, the multi-turn multi-domain NLU system 101 is a hybrid system with portions of the multi-turn multi-domain NLU system 101 on the client computing device 104 and with portions of the multi-turn multi-domain NLU system 101 on the server computing device 105 as Illustrated in FIG. 3B.

Figure 2:
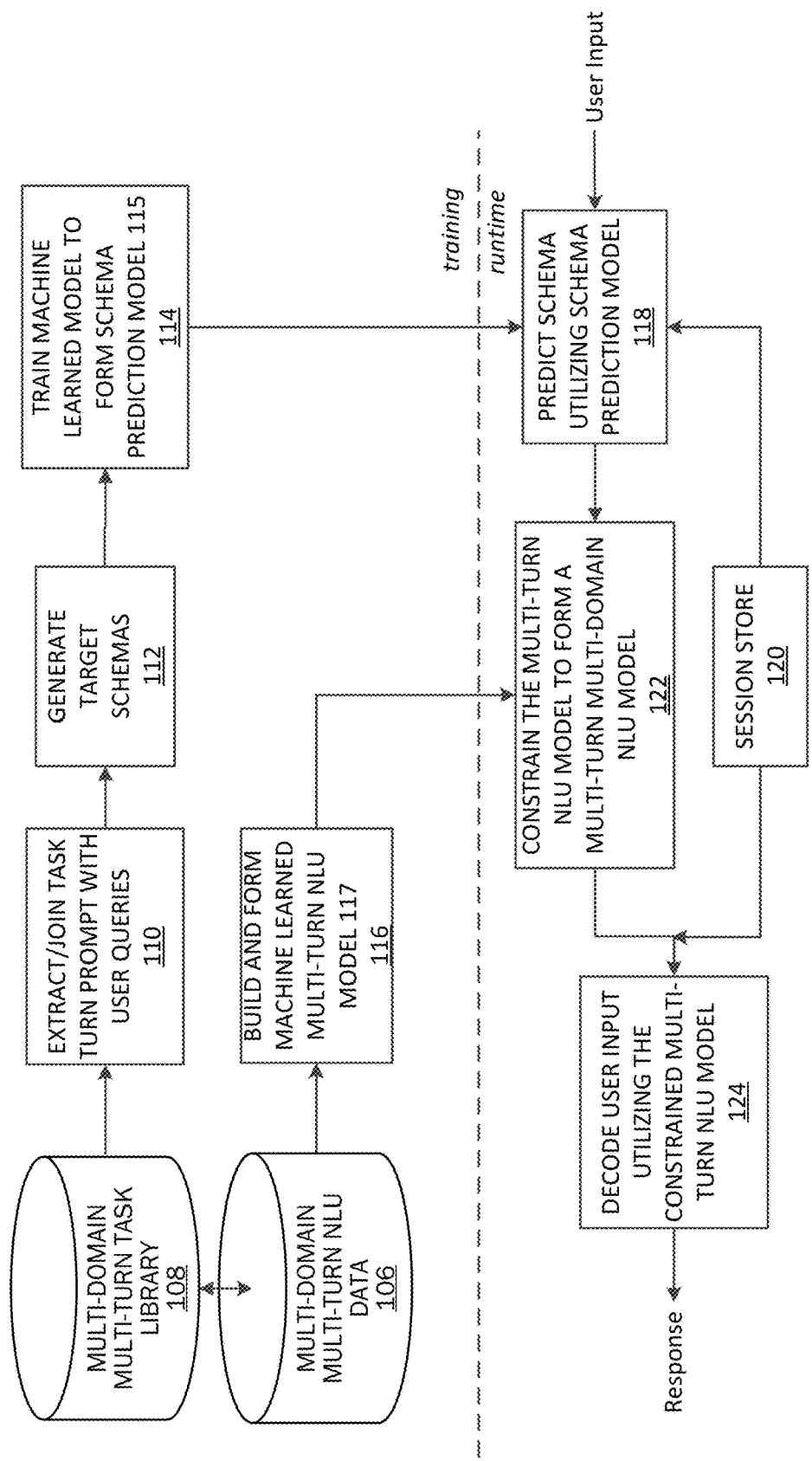
FIG. 2 is a simplified schematic block diagram illustrating a formation and use of a multi-turn cross-domain NLU system, in accordance with aspects of the disclosure.

As discussed above, the multi-turn multi-domain NLU system 101 includes a schema prediction model 115 and a general multi-turn NLU model 117. FIG. 2 illustrates an example of a simplified schematic flow diagram of the platform 100 for forming a multi-turn cross-domain NLU system 101 and use of the formed multi-turn cross-domain NLU system 101.

Figure 4:
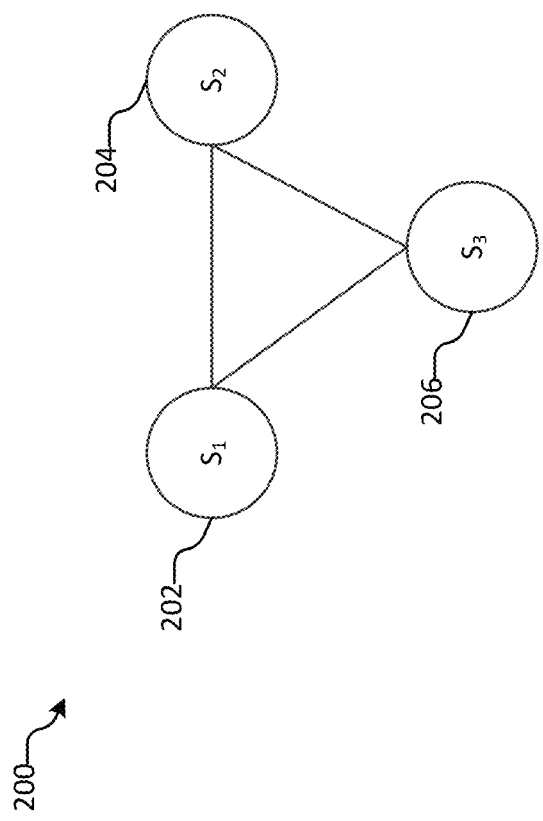
FIG. 4 is simplified schematic diagram illustrating an undirected graphical model of different possible schemas, in accordance with aspects of the disclosure.

The NLU system building platform 100 forms the schema prediction model 115 by training a model utilizing tasks from a multi-domain, multi-task library 108 and/or multi-domain multi-turn NLU data from database 106. The model is trained by extracting or joining task turn prompts from known user queries 110. As used herein, a user query is a user input that is a stored and retrievable from a library or database. Different possible schemas are generated from the joining or extracting of the task turn prompts from the known user schemas 112. The different possible schemas are utilized to train the model 114 to form the schema prediction model 115. The trained model or the schema prediction model 115 includes an undirected graph of the schema elements, which is used to predict the different possible schemas for a given input. FIG. 4 illustrates an example of an undirected graphical model 200 with a first possible schema element 202, a second possible schema element 204, and a third possible schema element 206. The undirected graphical model 200 is exemplary only, any number of possible schemas may be utilized to form the undirected graphical model. Each training domain corresponds to an instance in the undirected graphical model 200. Each instance is labeled with the corresponding training domain's true schema, such as a set of slots. During training, the model learns weights for features, which optimally relate to the inputs of the training domains and the training domain's observed slots.

The NLU system building platform 100 forms the general multi-turn NLU model 117 by training a model utilizing data from a multi-domain, multi-turn database 106 and/or tasks from a multi-domain, multi-turn library 108. The model is trained and formed 116 utilizing the retrieved tasks from library 108 and/or the NLU data from database 106. The trained model 117 is a machine learned NLU model for multi-turn dialogs. The two trained models 115 and 117 form the multi-turn multi-domain NLU system 101.

The NLU system building platform 100 provides the multi-turn multi-domain NLU system 101 to the builder 102. The builder 102 may then add the multi-turn multi-domain NLU system 101 to any desired digital agent, bot, messaging application, voice agent, or any other application type. Alternatively, the builder 102 may provide the multi-turn multi-domain NLU system 101 to another party for use any desired digital agent, bot, messaging application, voice agent, or any other application type. As such, formation of the multi-turn multi-domain NLU system 101 did not require the builder 102 to select a task and/or domain or to build a schema based on selected task and/or domain. Additionally, the formed multi-turn multi-domain NLU system 101 is not limited to a specific task and/or domain and, therefore, can be applied to any desired application, bot, and/or agent.

Once the multi-turn multi-domain NLU system 101 has been applied to an application, agent and/or bot, a user 103 may utilized the created multi-turn multi-domain NLU system 101. The multi-turn multi-domain NLU system 101 of a bot, application, or agent receives a user input via the client computing device 104. The user input may be text input, spoken language/voice input, and/or any other form of user input, such as gesture, touch, handwritten, clicks, selection, faction expressions, eye tracking, and etc. The client computing device 104 is configured to receive text input, spoken language input, and/or other modal input from a user 103 and/or builder 102. In some aspects, the client computing device 104 receives the spoken language input via a sensor on the client computing device 104, such as a microphone. The bot, agent, and/or application allows a user 103 to request actions via a text input, spoken language input and/or other modal input from a user device 104. The received user input could be any input received from the user 103 during any turn in a conversation or dialog. The user input may be from a first turn, a second turn, or any number of turn in a conversation or dialog with the multi-turn multi-domain NLU system 101.

The multi-turn multi-domain NLU system 101 receives the user input. The multi-turn multi-domain NLU system 101 determines or predicts a schema 118 utilizing the schema prediction model based on the user input. In some aspects, the multi-turn multi-domain NLU system 101 determines or predicts a schema utilizing the schema prediction model based on the user input and based on data from the session store 120. The session store may include a current task, a previously predicted schema, a session context, a dialog context, past system responses, past user inputs, and/or etc.

For example, the schema prediction model 115 includes a set of graph nodes $1, \ldots, m$ are assumed, where each node corresponds to a slot (s) and can be labeled with a binary value as shown in FIG. 4. For each training domain d, utterances $x^{(d)}$ and a binary labeling of the graph nodes $s^{(d)}$ are observed. For each node i, a feature vector $f_i(x^{(d)})$, is obtained by examining the domain's utterances. Similar feature vector for edges (i,j): $\delta_{jk}(x^{(d)})$ may also be obtained. $\delta$ is a function that evaluates to one if the expression evaluates to TRUE and evaluates to zero if the expression evaluates to FALSE. The probability of each labeling are then parameterized using a log-linear form over node and edge factors as illustrated by Equations #1-#5 below:

$$\log P(s^{(d)} \mid x^{(d)}) =$$
$$\sum_i \lambda_i \cdot [f_i(x^{(d)})\delta(s_i^{(d)} = 1)] + \sum_{j,k} \lambda_{jk1} \cdot [s_{jk}(x^{(d)})\delta(s_j^{(d)} = 1 \wedge s_k^{(d)} = 1)] +$$
$$\sum_{j,k} \lambda_{jk2} \cdot [s_{jk}(x^{(d)})\delta(s_j^{(d)} = 1 \wedge s_k^{(d)} = 0)] +$$
$$\sum_{j,k} \lambda_{jk3} \cdot [s_{jk}(x^{(d)})\delta(s_j^{(d)} = 0 \wedge s_k^{(d)} = 1)] - \log Z(x^{(d)}, \lambda)$$

The first term sums over nodes i in the graph. For each i, a feature vector $f_i(x^{(d)})$ is extracted. If the label of node i is 1, the dot product of the feature vector and corresponding parameters is taken, otherwise the dot product of the feature vector is zeroed out. Likewise for the graph edge j, k: the feature vector is extracted, and depending on the slots of the two vertices $s_j$ and $s_k$, a dot product with the relevant parameters is taken. The final term is a normalization constant to ensure that the probabilities sum to one over all possible slots of the graph. In this example, the schema prediction model is a log-linear model. $\lambda$ is a model parameter of the model.

Once a schema has been predicted by schema prediction model 115 based at least on the user input, the multi-turn multi-domain NLU system 101 constrains the machine learned multi-turn NLU model 117 based on the predicted schema 122 to form a constrained multi-turn NLU model. For example, given a predicted schema $s \subset y$ for a new domain, a constrained lattice is defined based on Equation #6 listed below:

$$\mathcal{Y}(x,s) = \mathcal{Y}(x_1,s) \times \ldots \times \mathcal{Y}(x_n,s) \quad \text{EQ#6}$$

y denotes the different types of slots. In other words, only certain nodes, based on the predicted schema, of the multi-turn NLU model 117 are available or provided for decoding in the formed constrained multi-turn NLU model.

Once the constrained multi-turn NLU model has been formed, the constrained multi-turn NLU model is utilized to decode the user input 124 to determine a response to the user input. In some aspects, additional information from the session store 120 is also utilized by the constrained multi-turn NLU model to decode the user input 124. For example, the decoding in the constrained lattice may be performed based on Equation #7 listed below:

$$f(x_1 \ldots x_n, s) = \underset{y(x,s)}{\operatorname{argmax}} p(x_1 \ldots x_n, y_1 \ldots y_n) \quad \text{EQ #7}$$

Figure 5:
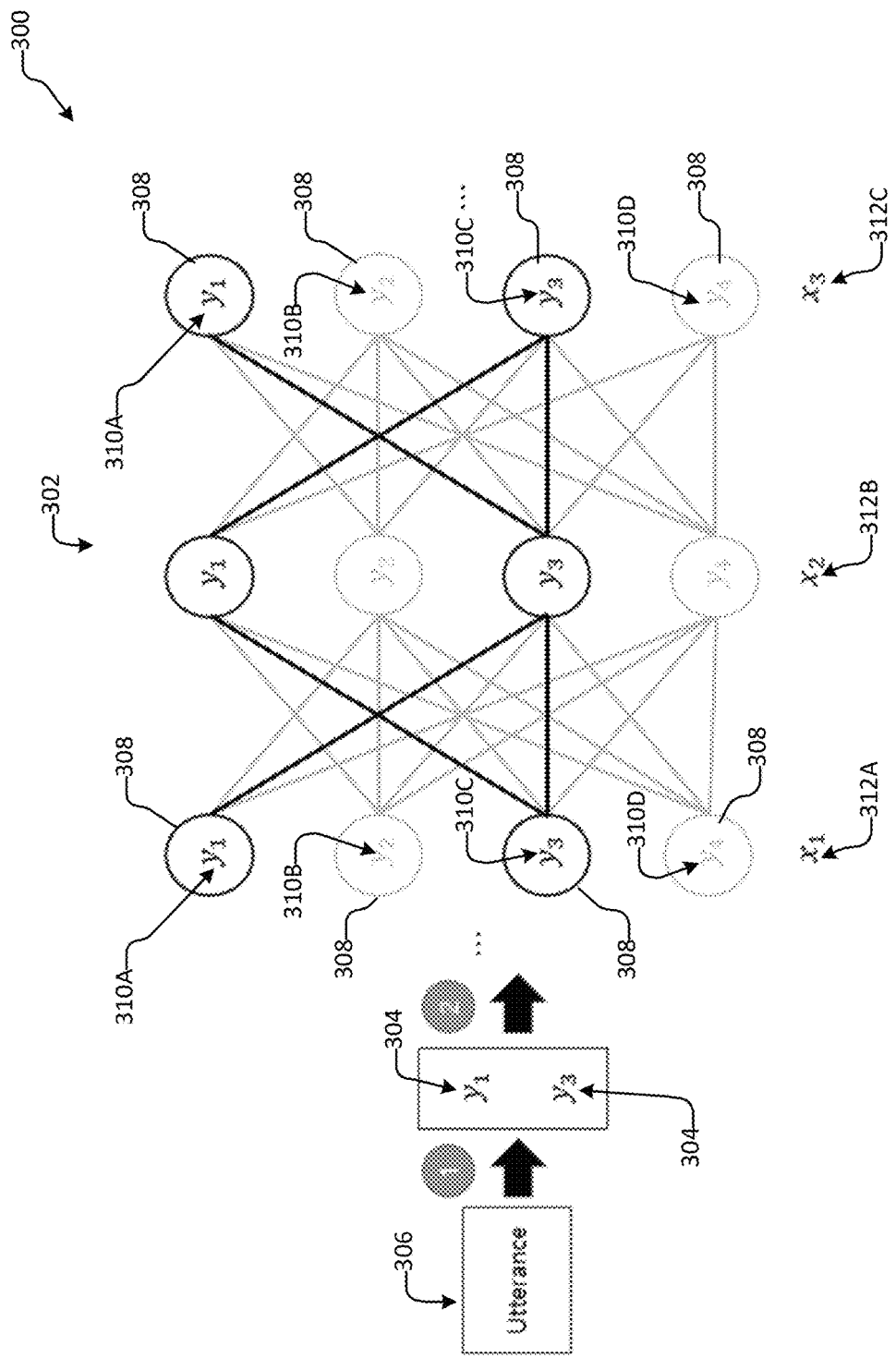
FIG. 5 is simplified schematic diagram illustrating a constrained decoding of a user input by a multi-turn cross-domain NLU system, in accordance with aspects of the disclosure.

Arg max y is the action of maximizing over possible label sequence and Arg max p is a mathematical term representing a maximizing of the probability of the label sequence for each given input. In another example, FIG. 5 illustrates simplified schematic example 300 of a constrained lattice based on a predicted schema 302 being utilized to decode elements 304 of a user input 306. Each node 308 of the constrained lattice based on a predicted schema 302 represents an extracted feature 310 which correlate different words 312. In this example, the portion of the constrained lattice based on a predicted schema 302 shown contains four different extracted features, $y_1$ 310A, $y_2$ 310B, $y_3$ 310C, and $y_4$ 310C. Further, in this example, the portion of the constrained lattice based on a predicted schema 302 shown show three different correlated words $x_1$ 312A, $x_2$ 312B, and $x_3$ 312C. As known by a person of skill in the art, any number of features 310 and correlated words 312 may be utilized as needed by the constrained lattice based on a predicted schema 302. As such, step 1 of FIG. 5 illustrates the user input 306 being parsed into various different elements 304. Step 2 of FIG. 5 illustrates the elements 304 being decoded by the constrained lattice based on a predicted schema 302 to identify a response to the received user input 306.

Once the response has been determined by the decoding, the response is provided for delivery to user 103. The response may be provided to the client computing device 104 for delivery to the user 103. The client computing device delivers the response to the user. In some aspects the response is instructions to perform a given task or action. In some aspects, the response is automatically performed by the client computing device 104. In other aspects, the response is sent from a server computing device 105 to the client computing device 104 as instructions for performance by the client computing device 104. The response may be any action performed by the device 104 in order to reply to or answer the user input. The response may include an answer to the user input or performance of a requested task or action based on the user input. The response may also include a question to the user 103. For example, if the user input includes a request to create a meeting, the response may be "for what time." For example, the response action may include creating a calendar event, sending a text message, setting a reminder, performing a query using a search engine (e.g., Bing, Google, Yahoo), and the like. In some aspects, the response is converted into phrases, words, and/or terms.

Figure 6A:
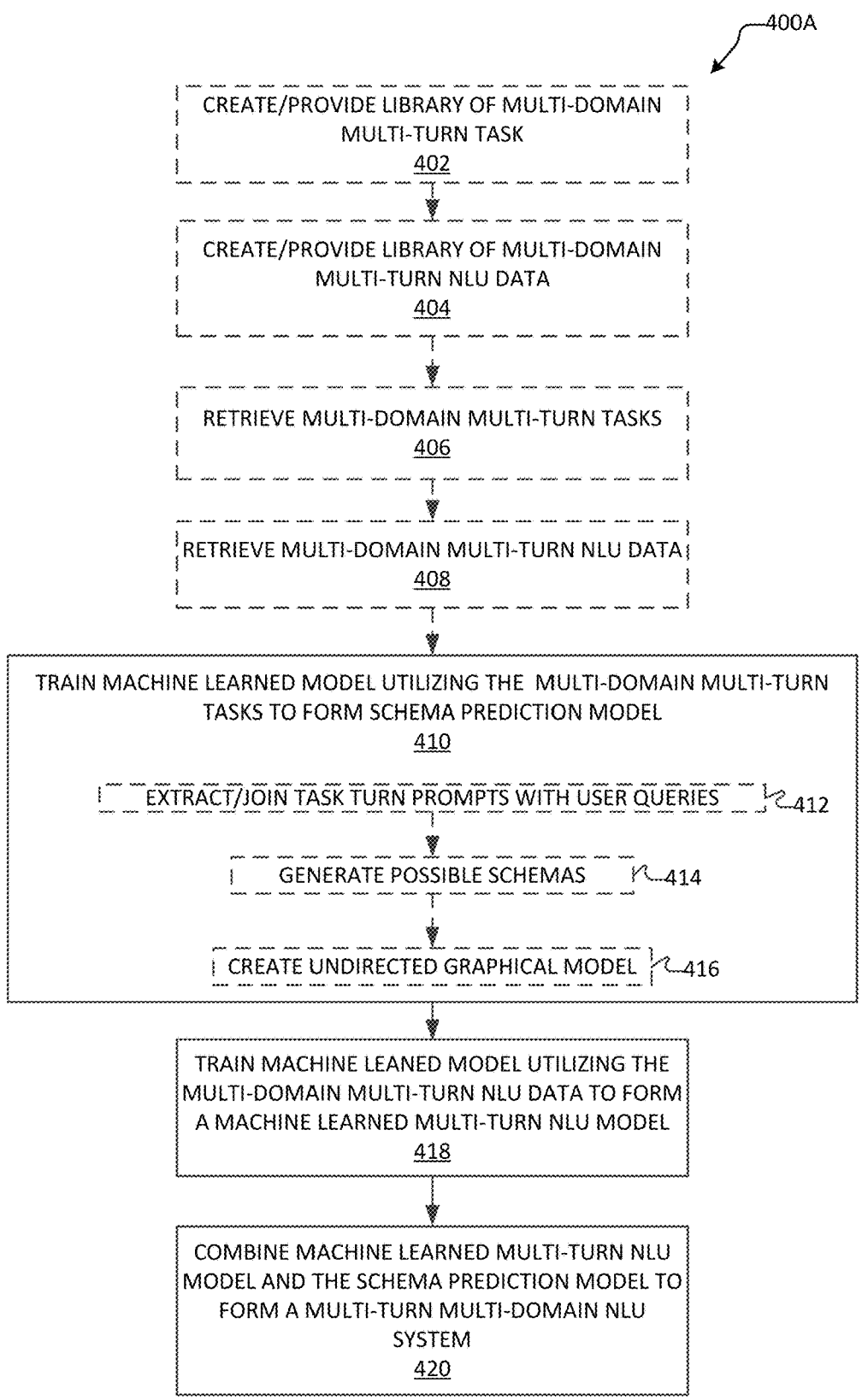
FIG. 6A is block flow diagram illustrating a method for building a multi-turn cross-domain NLU system, in accordance with aspects of the disclosure.

FIG. 6A illustrates a flow diagram conceptually illustrating an example of a method 400A for building a multi-turn multi-domain NLU system. In some aspects, method 400A is performed by the NLU system building platform 100 as described above. Method 400A provides a method for building a multi-turn multi-domain NLU system without requiring the builder to provide a task or domain and to build a schema based on the task for the NLU system. More specifically, method 400A trains two different models to form a schema prediction model and a general NLU model. As such, method 400A provides a method for building a multi-turn cross-domain NLU system that is easier to use, requires less expertise, less time and fewer resources than required by previously utilized methods for building NLU systems that are task or domain specific.

In some aspects, method 400A includes operation 402. At operation 402, a library of multi-domain multi-turn tasks is provided to the builder. In some aspects, the library of multi-domain multi-turn tasks is created at operation 402 prior to providing access to the library to the builder.

In some aspects, method 400A includes operation 404. At operation 404, a library of multi-domain multi-turn NLU data is provided to the builder. In some aspects, the library of multi-domain multi-turn data is created at operation 404 prior to providing access to the library to the builder.

In some aspects, method 400A includes operation 406. At operation 406, multi-domain multi-turn tasks are retrieved. The multi-domain multi-turn tasks may be retrieved from an accessible library of multi-domain multi-turn tasks provided at operation 402. In some aspects, method 400A includes operation 408. At operation 408, multi-domain multi-turn NLU data is retrieved. The multi-domain multi-turn NLU data may be retrieved from an accessible library of multi-domain multi-turn data provided at operation 404.

At operation 410 a model is trained to form a schema prediction model. The model may be a machine learned model. Further, the model may be trained at operation 410 utilizing the multi-domain multi-turn tasks retrieved at operation 406 and/or multi-domain multi-turn NLU data retrieved at operation 408. The model is trained to predict schematic labeling of a user input. The schema prediction model is an undirected graphical model representing different possible schemas.

In some aspects, operation 410 includes operations 412, 414, and/or 416. At operation 412 task turn prompts may be extracted with stored user queries to form extracted task turn prompts. Further, at operation 412, task turn prompts may be joined to stored user queries to form extracted task turn prompts. Next, at operation 414 a plurality of different possible schemas are generated based on the extracted task turn prompts. After the different possible schemas are generated at operation 414, an undirected graphical model of the different possible schema elements is created during operation 416 to create the schema prediction model.

At operation 418 a model is trained to form a multi-turn NLU model. The model may be a machine learned model. Further, the model may be trained at operation 418 utilizing the multi-domain multi-turn NLU data retrieved at operation 408 and/or the task retrieved at operation 406. The model may be trained to form a general multi-turn machine learned NLU model.

Figure 6B:
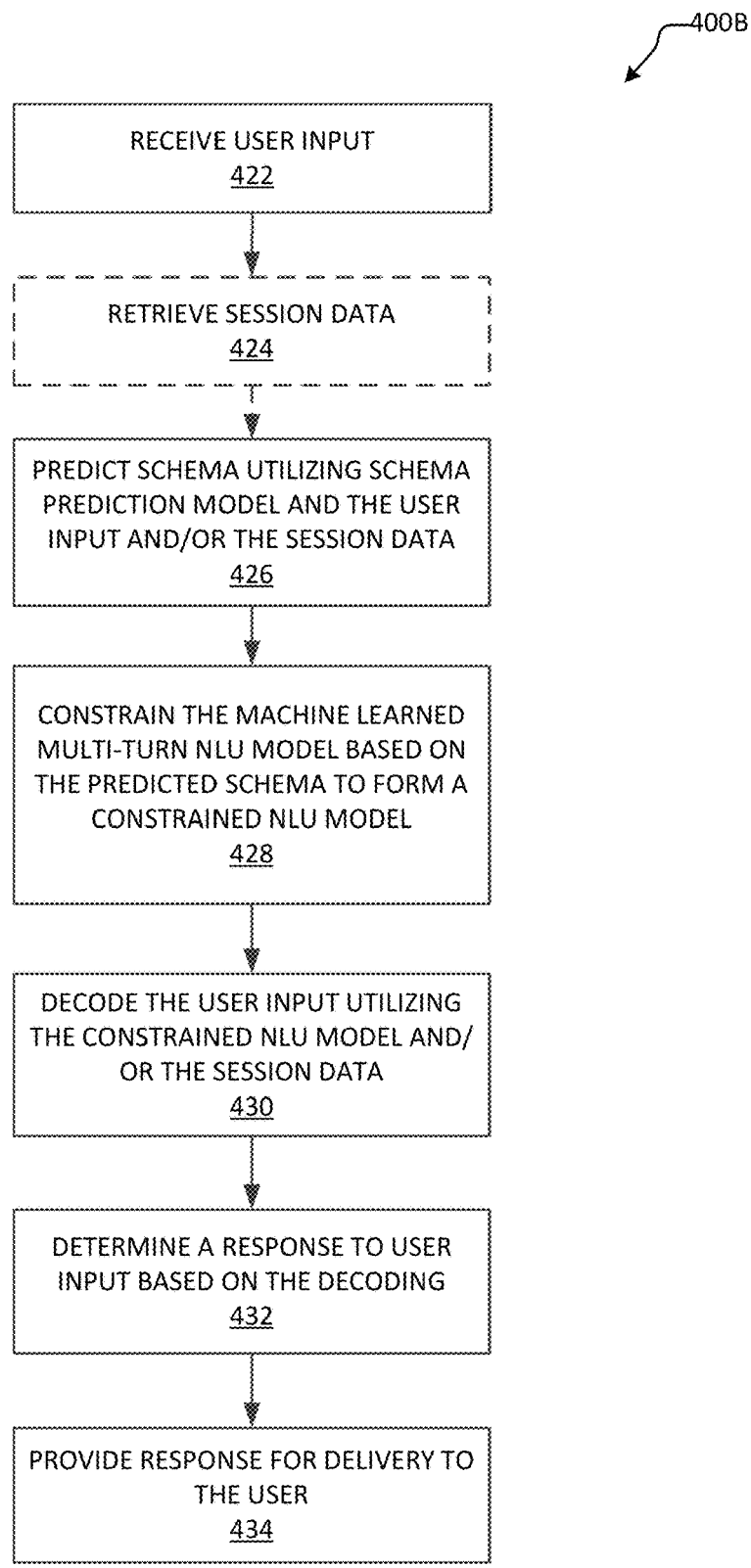
FIG. 6B is block flow diagram illustrating a method for using the multi-turn cross-domain NLU system formed during the method illustrated in FIG. 6A, in accordance with aspects of the disclosure.

The combination of the schema prediction model and the multi-turn NLU model form a multi-domain multi-turn NLU system at operation 420. The multi-domain multi-turn NLU system is not limited to a specific task and/or domain. As such, the multi-domain multi-turn NLU system can be utilized in a bot, agent, and/or application for any type of task. FIG. 6B illustrates a flow diagram conceptually illustrating an example of a method 400B for using the multi-turn multi-domain NLU system formed during method 400A. In some aspects, method 400B is performed by the multi-turn cross-domain NLU system 101 as described above. Method 400B provides a method for using a multi-turn multi-domain NLU system that is able to predict a schema based merely on the user input. More specifically, method 400B provides a method for decoding a user input without requiring a trained task specific NLU system. As such, method 400B provides a method for using NLU system that is more versatile than previously utilized methods for using NLU systems that are task or domain specific.

At operation 422, a user input is received. The user input may any modal form input from a user. The input may be received from a user of the multi-domain multi-turn NLU system and/or from a client computing device.

In some aspects, method 400B includes operation 424. At operation 424, session data is retrieved. The session data may be stored data. In some aspects, the session data may be stored by a client computing device and/or a server computing device running the multi-turn multi-domain NLU system.

In response to receiving the user input at operation 422, operation 426 is then performed. At operation 426, a schema is predicted utilizing the schema prediction model formed during operation 410. At operation 426, the schema prediction model predicts a schema based at least on the user input. In some aspects, the schema prediction model predicts a schema based on the user input and stored session information or data at operation 426. For example, equations #1-#5, as listed above, may be utilized to predict the schema at operation 426.

Next, at operation 428, the multi-turn NLU model is constrained based on the predicted schema to form a constrained NLU model. In some aspects, only certain nodes, based on the predicted schema, of the multi-turn NLU model 117 are available or provided for decoding in the formed constrained multi-turn NLU model. For example, equation #6, as listed above, may be utilized to constrain the multi-turn NLU model based on the predicted schema.

The user input is decoded utilizing at least the constrained NLU model at operation 430. In some aspects, at operation 430, the user input is decoded utilizing the constrained NLU model and session data as retrieved at operation 424. For example, equation #7, as listed above, may be utilized to decode the user input utilizing the constrained NLU model. Additionally, FIG. 5 illustrates an example of a simplified schematic diagram of operation 430.

Next, at operation 432 a response is determined based on the decoding of the user input at operation 430. The response may be verbal, textual, and/or audio response to the user input. In some aspects, the response is a performance of an action or task. In some aspects, the response is instruction to perform a task or action. As such, the response is provided for delivery to the user at operation 434. In some aspects, the response is provided to a client computing device 104 and/or a server computing device 105 for execution. In other aspects, the response is provided upon execution by the client computing device 104 and/or a server computing device 105.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein.

Figure 7:
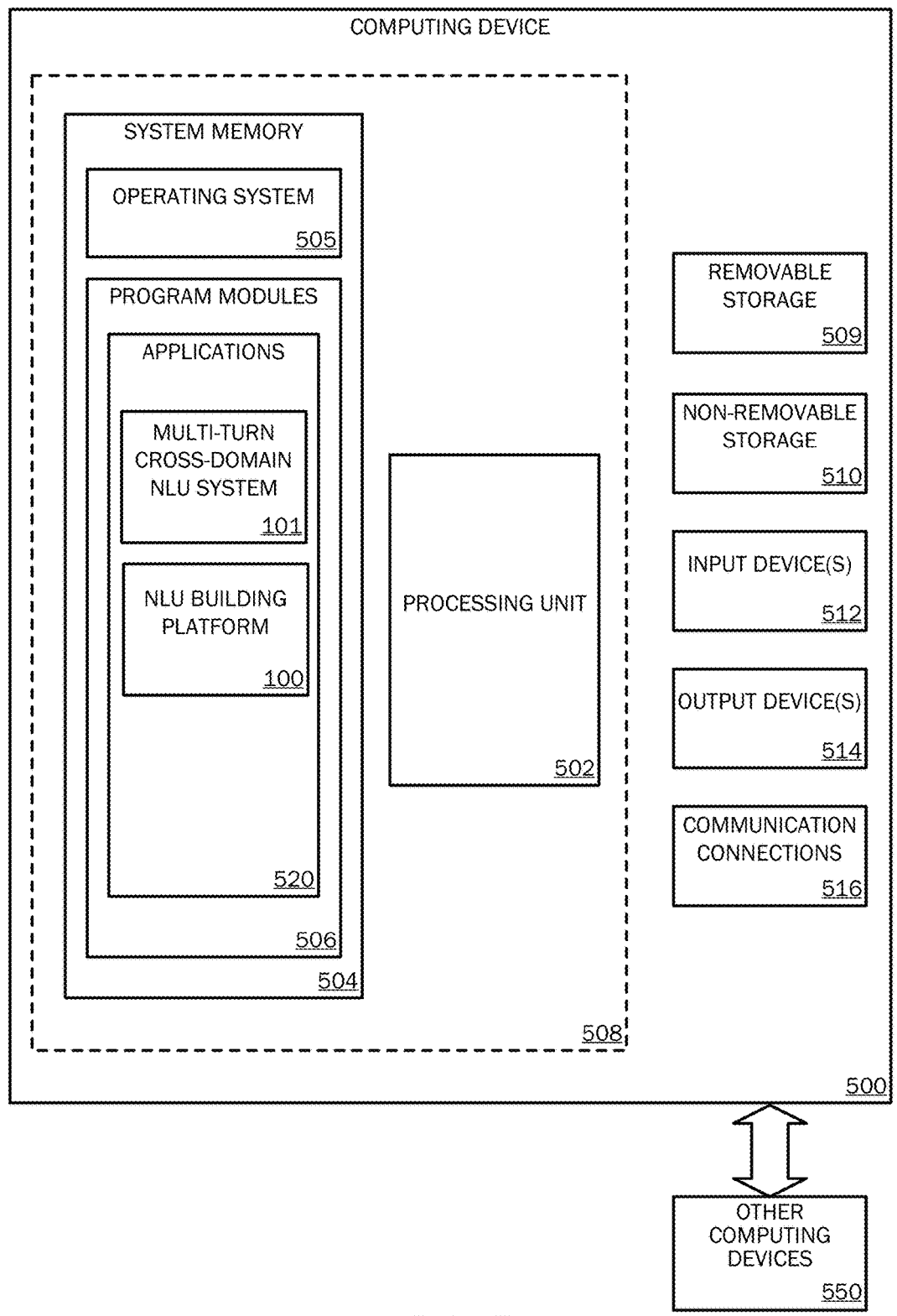
FIG. 7 is a block diagram illustrating example physical components of a computing device with which various aspects of the disclosure may be practiced.

FIG. 7 is a block diagram illustrating physical components (e.g., hardware) of a computing device 500 with which aspects of the disclosure may be practiced. For example, the NLU system building platform 100 and/or the multi-turn multi-domain NLU system 101 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the NLU system building platform 100 that can be executed to employ method 400A to create a multi-turn multi-domain NLU system 101 as disclosed herein. Additionally, the computing device components described below may include computer executable instructions for using the multi-turn multi-domain NLU system 101 that can be executed to employ method 400B as disclosed herein.

In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combined of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 7 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 7 by a removable storage device 509 and a non-removable storage device 510. For example, the stored session information and/or the multi-domain multi-turn tasks and/or the multi-turn multi-domain NLU data could be stored on any of the illustrated storage devices.

As stated above, a number of program modules and data files may be stored in the system memory 504. While executing on the processing unit 502, the program modules 506 (e.g., the NLU system building platform 100 and/or the multi-turn multi-domain NLU system 101) may perform processes including, but not limited to, performing method 400A and/or 400B as described herein. For example, the processing unit 502 may implement the NLU system building platform 100 and/or the multi-turn multi-domain NLU system 101. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc. In some aspect, the NLU system building platform 100 allows a builder to build a multi-turn multi-domain NLU system 101 for one or more of the above referenced applications.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip).

Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
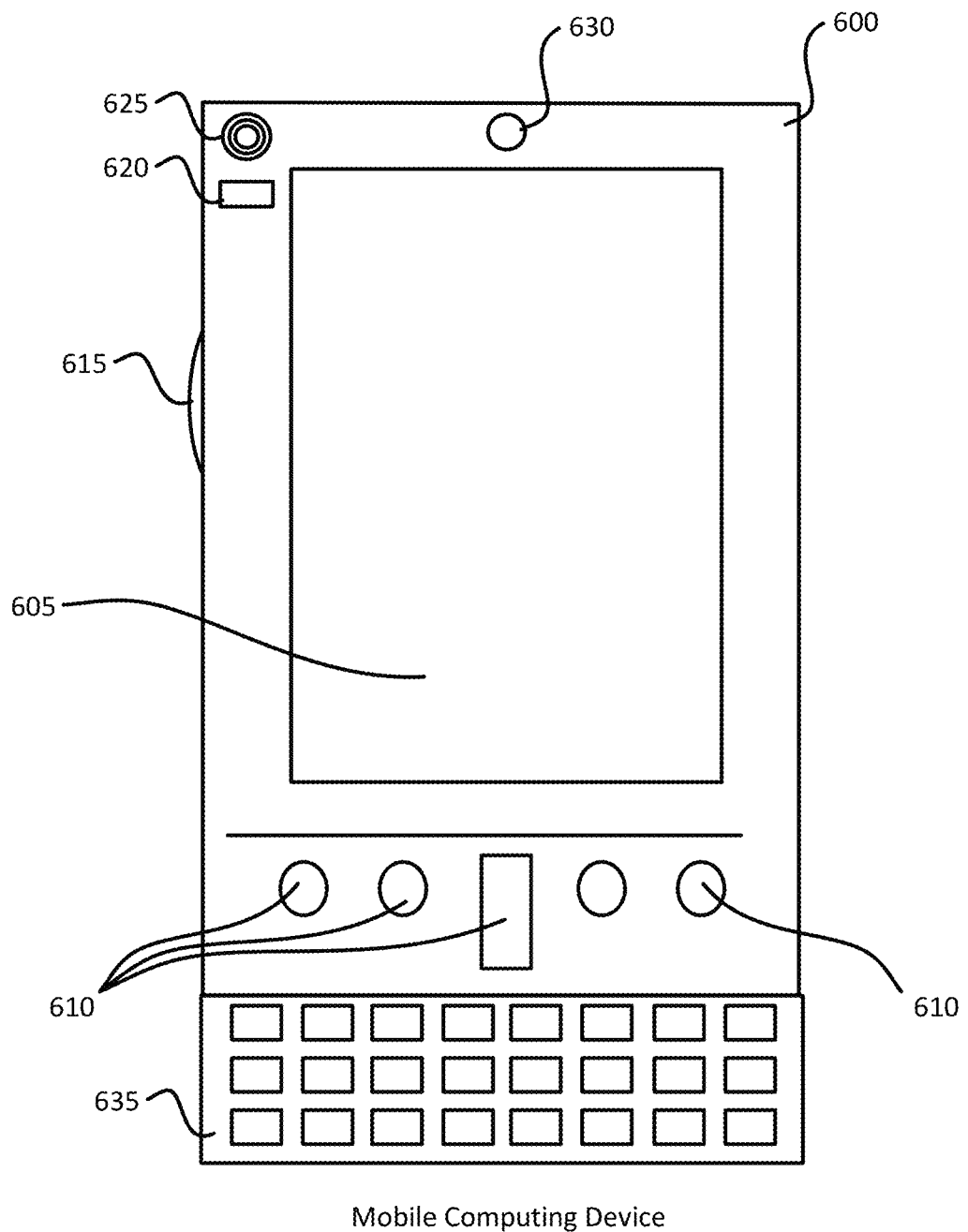
FIG. 8A is a simplified block diagram of a mobile computing device with which various aspects of the disclosure may be practiced.
Figure 8B:
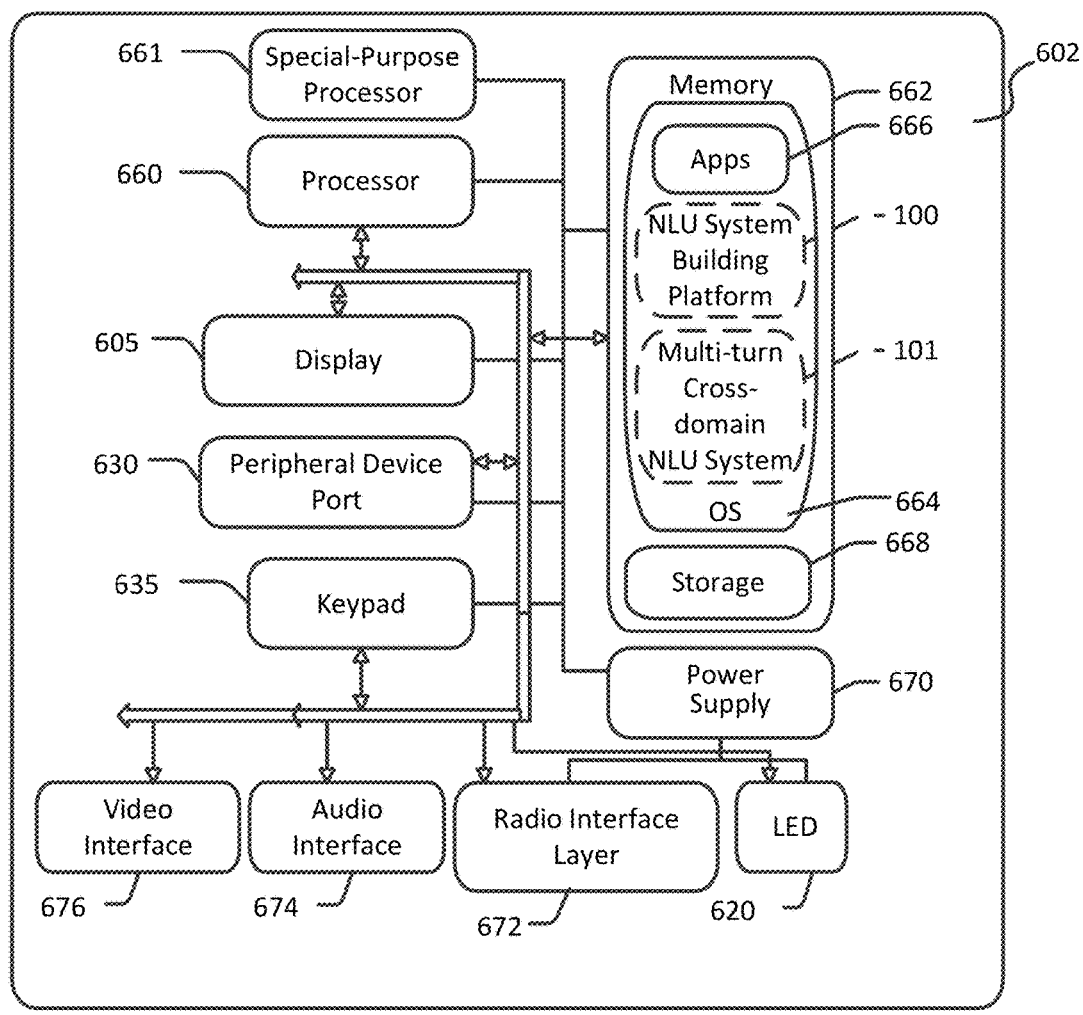
FIG. 8B is a simplified block diagram of the mobile computing device shown in FIG. 10A with which various aspects of the disclosure may be practiced.

FIGS. 8A and 8B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 8A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666, the NLU system building platform 100 and/or the multi-turn multi-domain NLU system 101 run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 8B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 9:
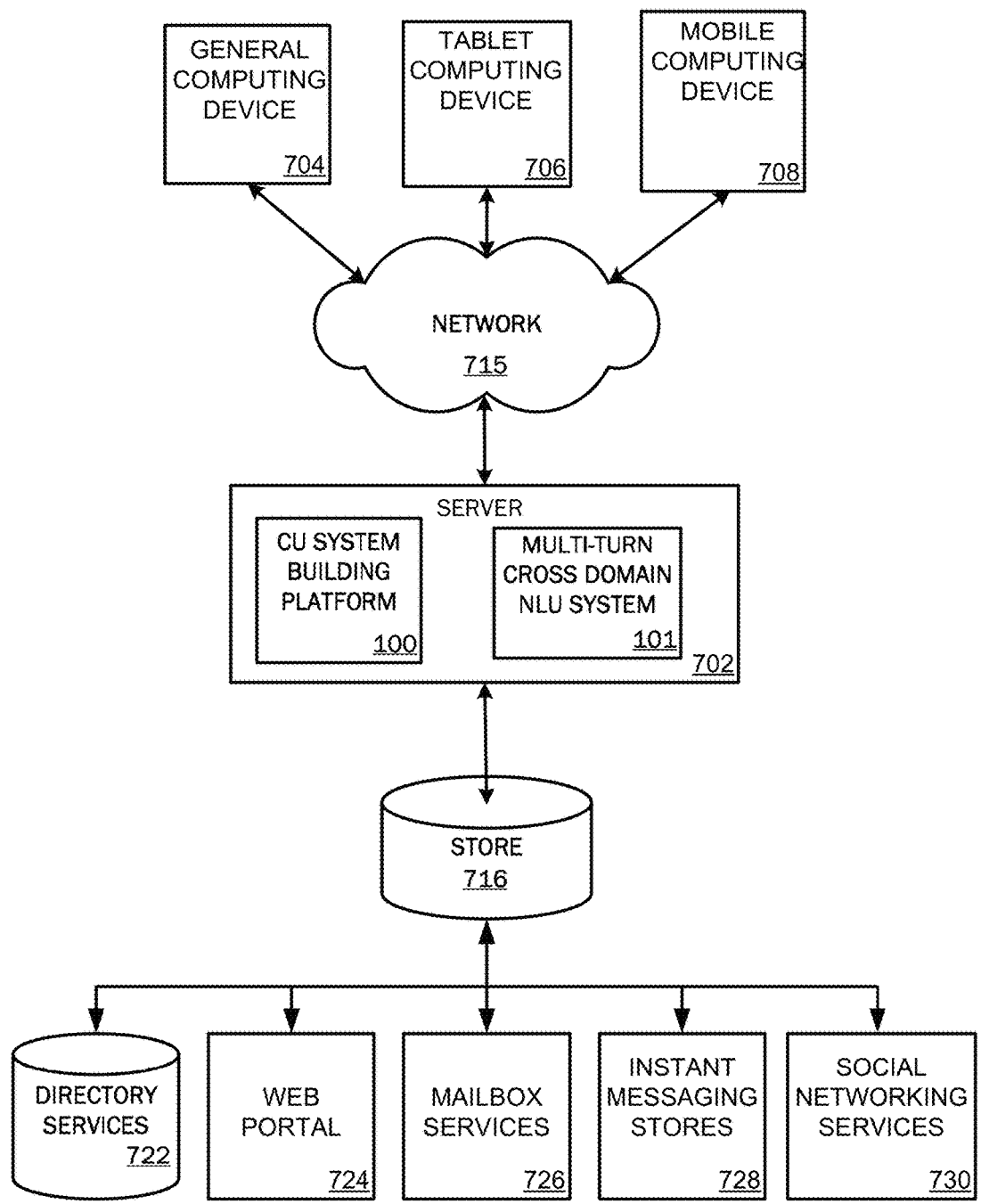
FIG. 9 is a simplified block diagram of a distributed computing system in which various aspects of the disclosure may be practiced.

FIG. 9 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types. For example, various documents may be stored using a directory service 722, a web portal 724, a mailbox service 726, an instant messaging store 728, and/or a social networking site 730. By way of example, the NLU system building platform 100 and/or the multi-turn multi-domain NLU system 101 may be implemented in a general computing device 704, a tablet computing device 706 and/or a mobile computing device 708 (e.g., a smart phone). In some aspects, the server 702 is configured to implement a NLU system building platform 100 and/or the multi-turn multi-domain NLU system 101, via the network 715 as illustrated in FIG. 9.

Figure 10:
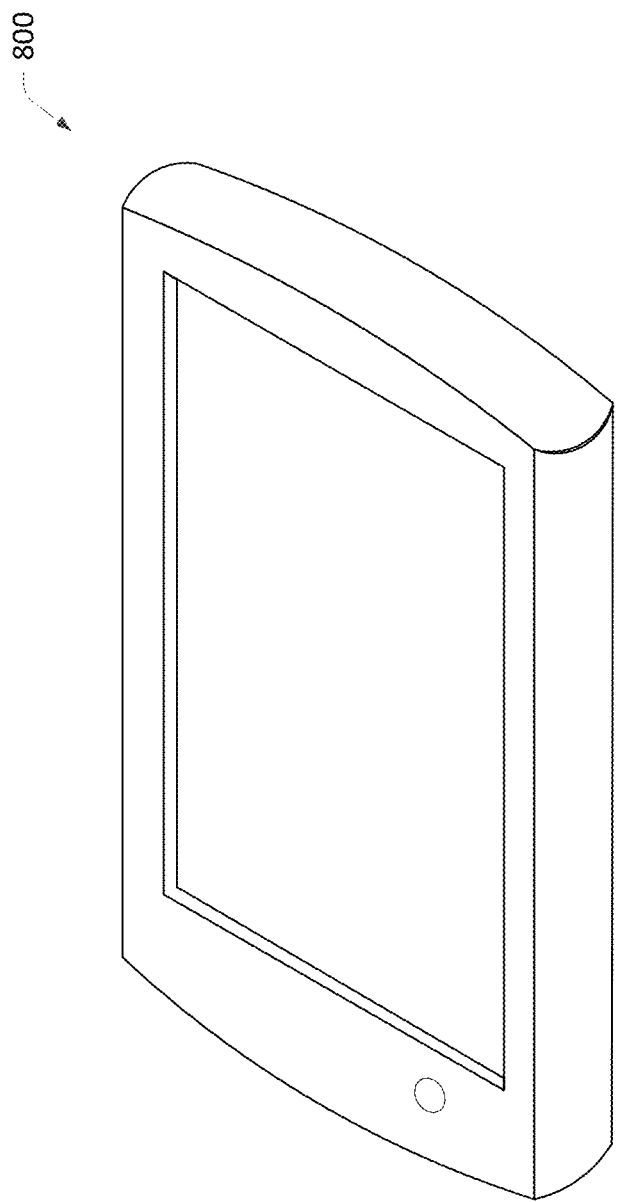
FIG. 10 illustrates a tablet computing device with which various aspects of the disclosure may be practiced

FIG. 10 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Embodiments of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific aspects disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various aspects disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A multi-turn cross-domain natural language understanding (NLU) system for an application, the system comprising:
    at least one processor; and
    a memory for storing and encoding computer executable instructions that, when executed by the at least one processor is operative to:
        receive a user input from a user;
        predict a schema utilizing a schema prediction model by relating features of the user input to slots of a training domain;
        constrain a NLU model by making nodes on the NLU model unavailable that do not relate to the schema to form a constrained NLU model; and
        decode the user input utilizing the constrained NLU model to determine a response to the user input, and deliver the response to a user.

2. The system of claim 1, further comprising:
    retrieving stored session information in response to receiving the user input;
    wherein predicting the schema utilizing the schema prediction model is further based on the stored session information.

3. The system of claim 2, wherein the stored session information includes at least one of a current task, a session context, past system responses, or past user inputs.

4. The system of claim 1, further comprising:
    retrieving stored session information in response to receiving the user input;
    wherein the decoding of the user input also utilizes the stored session information in addition to the constrained NLU model to determine the response to the user input.

5. The system of claim 4, wherein the stored session information includes at least one of a current task, a session context, past system responses, or past user inputs.

6. The system of claim 1, wherein the response is performance of an action.

7. The system of claim 1, wherein the system is run on a server computing device.

8. The system of claim 1, wherein the application is at least one of:
    a digital assistant application;
    a voice recognition application;
    an email application;
    a social networking application;
    a collaboration application;
    an enterprise management application;
    a messaging application;
    a word processing application;
    a spreadsheet application;
    a database application;
    a presentation application;
    a contacts application;
    a gaming application;
    an e-commerce application;
    an e-business application;
    a transactional application;
    a device control application;
    a web interface application;
    an exchange application; or
    a calendaring application.

9. A system with a platform for building multi-turn cross-domain natural language understanding (NLU) system for an application, the system comprising:
- at least one processor; and
- a memory for storing and encoding computer executable instructions that, when executed by the at least one processor is operative to:
  - retrieve multi-domain multi-turn tasks from a library;
  - train a first model utilizing the multi-domain multi-turn tasks to predict a schema of a user input to form a schema prediction model, wherein the schema is a group labels or slots utilized in a training domain;
  - retrieve multi-domain multi-turn NLU data from a database; and
  - train a second model utilizing the multi-domain multi-turn NLU data to form a natural language understanding (NLU) model,
  - wherein the schema prediction model and the NLU model form the multi-turn cross-domain NLU system, wherein a predicted schema from the schema prediction model for a user input is used to constrain nodes available in the NLU model during interpretation of the user input by the NLU model in order to decode the user input and deliver a response.

10. The system of claim 9, wherein train the first model to predict the schematic labeling of the user input comprises:
- extract task turn prompts with known user queries from the library to form extracted task turn prompts;
- generate different possible schemas based on the extracted task turn prompts; and
- form the schema prediction model based on the different possible schemas.

11. The system of claim 10, wherein the schema prediction model utilizes an undirected graph of schema elements to predict the different possible schemas for the user input.

12. The system of claim 11, wherein the NLU model constrained by the predicted schema generates a response to the user input.

13. The system of claim 11, wherein the schema prediction model constrains the nodes available in the NLU model based further on retrieved session information.

14. The system of claim 9, wherein the first model is further trained utilizing the multi-domain multi-turn NLU data, and wherein the second model is further trained utilizing the multi-domain multi-turn tasks.

15. A method for building a multi-turn cross-domain natural language understanding (NLU) system, the method comprising:
- training a first model to predict schematic labeling of a user input to form a schema prediction model;
- training a second model to form a NLU model;
- wherein the schema prediction model and the NLU model form the multi-turn cross-domain NLU system that is capable of:
  - receiving the user input from a user;
  - predicting a schema utilizing the schema prediction model by relating features of the user input to one or more slots of a training domain;
  - constraining the NLU model by making nodes on the NLU model unavailable that do not relate to the schema to form a constrained NLU model;
  - decoding the user input utilizing the constrained NLU model to determine a response to the user input, and deliver the response to a user.

16. The method of claim 15, wherein the multi-turn cross-domain NLU system is further capable of:
- retrieving stored session information in response to receiving the user input;
- wherein predicting the schema utilizing the schema prediction model is further based on the stored session information.

17. The method of claim 16, wherein the stored session information includes at least one of a current task, a session context, past system responses, or past user inputs.

18. The method of claim 15, wherein the multi-turn cross-domain NLU system is further capable of:
- retrieving stored session information in response to receiving the user input;
- wherein the decoding of the user input also utilizes the stored session information in addition to the constrained NLU model to determine the response to the user input.

19. The method of claim 18, wherein the stored session information includes at least one of a current task, a session context, past system responses, or past user inputs.

20. The method of claim 15, wherein the response answers the user input.

* * * * *